United States Patent
Endres et al.

(10) Patent No.: US 12,286,560 B2
(45) Date of Patent: Apr. 29, 2025

(54) METHOD FOR PRODUCING DOPED ALKALI SILICATE PROTECTIVE LAYERS ON METAL AND GLASS SUBSTRATES

(71) Applicant: EPG (ENGINEERED NANOPRODUCTS GERMANY) AG, Griesheim (DE)

(72) Inventors: Klaus Endres, Bad Homburg (DE); Barbara Kutzky, Saarbruecken (DE); Emilie Pierre, Willerwald (FR); Thomas Dembski, Guenviller (FR)

(73) Assignee: EPG (ENGINEERED NANOPRODUCTS GERMANY) AG, Griesheim (DE)

( * ) Notice: Subject to any disclaimer, the term of this patent is extended or adjusted under 35 U.S.C. 154(b) by 462 days.

(21) Appl. No.: 17/310,248

(22) PCT Filed: Jan. 15, 2020

(86) PCT No.: PCT/EP2020/050935
§ 371 (c)(1),
(2) Date: Jul. 27, 2021

(87) PCT Pub. No.: WO2020/156815
PCT Pub. Date: Aug. 6, 2020

(65) Prior Publication Data
US 2022/0195206 A1    Jun. 23, 2022

(30) Foreign Application Priority Data

Jan. 29, 2019 (DE) .......................... 102019102202.9

(51) Int. Cl.
| | | |
|---|---|---|
| C23D 5/00 | (2006.01) | |
| C03C 17/02 | (2006.01) | |
| C08G 77/08 | (2006.01) | |
| C08G 77/18 | (2006.01) | |
| C08K 3/22 | (2006.01) | |
| C09D 5/08 | (2006.01) | |
| C09D 183/04 | (2006.01) | |
| C23D 13/00 | (2006.01) | |

(52) U.S. Cl.
CPC .............. C09D 5/084 (2013.01); C03C 17/02 (2013.01); C08G 77/08 (2013.01); C08G 77/18 (2013.01); C08K 3/22 (2013.01); C09D 183/04 (2013.01); C23D 5/00 (2013.01); C23D 13/00 (2013.01)

(58) Field of Classification Search
CPC .......... C23D 5/00; C23D 13/00; C03C 17/02; C09D 183/04
See application file for complete search history.

(56) References Cited

U.S. PATENT DOCUMENTS

| | | | | |
|---|---|---|---|---|
| 5,431,804 A * | 7/1995 | Caballero | ................ | G02B 5/08 |
| | | | | 205/639 |
| 6,162,498 A | 12/2000 | Mennig et al. | | |
| 8,133,315 B2 | 3/2012 | Endres et al. | | |
| 8,133,579 B2 | 3/2012 | Mennig et al. | | |
| 2003/0039848 A1* | 2/2003 | Murata | .................... | C02F 1/325 |
| | | | | 428/448 |
| 2006/0228575 A1* | 10/2006 | Klos | ........................ | C25D 5/48 |
| | | | | 428/621 |
| 2007/0178316 A1* | 8/2007 | Mellott | ............... | C03C 17/3663 |
| | | | | 427/372.2 |
| 2008/0125564 A1 | 5/2008 | Endres et al. | | |
| 2008/0274290 A1* | 11/2008 | Fairbourn | ........... | C23C 18/1279 |
| | | | | 427/376.2 |
| 2010/0178491 A1 | 7/2010 | Mennig et al. | | |
| 2011/0100420 A1* | 5/2011 | Clevenger | ........... | H01L 31/0488 |
| | | | | 136/246 |
| 2012/0010350 A1* | 1/2012 | Mok | .................... | C09D 183/06 |
| | | | | 524/506 |
| 2013/0020335 A1* | 1/2013 | Schmidt | .................. | C04B 35/14 |
| | | | | 427/397.8 |
| 2018/0022938 A1* | 1/2018 | Ijeri | .................... | C23C 18/1208 |
| | | | | 428/469 |

FOREIGN PATENT DOCUMENTS

| | | | | |
|---|---|---|---|---|
| CN | 108102447 A * | 6/2018 | ............... | C09D 5/08 |
| DE | 3828098 A1 | 3/1990 | | |
| DE | 19714949 A1 | 10/1998 | | |
| DE | 10059487 A1 | 6/2002 | | |
| DE | 102007029668 A1 | 1/2009 | | |
| DE | 102008039326 A1 | 2/2010 | | |
| DE | 102008063161 A1 * | 7/2010 | ............. | C23D 5/02 |
| JP | 2003-192329 * | 7/2003 | ............. | C01B 33/12 |
| WO | 2006077124 A1 | 7/2006 | | |
| WO | WO 2006/077124 A2 * | 7/2006 | | |

OTHER PUBLICATIONS

Monti, Matteo, et al., "New protective coatings for ancient glass: Silica thin-films from perhydropolysilazane". Journal of Cultural Heritage, 9 (2008), e413-e415.*

(Continued)

*Primary Examiner* — Bret P Chen
(74) *Attorney, Agent, or Firm* — Abel Schillinger, LLP

(57) ABSTRACT

A method for producing a glass-like protective layer on an optionally pre-coated metal or glass substrate. The method comprises:
(a) mixing one or more defined silicon compounds with NaOH and KOH,
(b) adding water to the mixture obtained in (a) to hydrolyze the silicon compound(s),
(c) adding at least one defined compound of formula $MY_m$, where M is Pb, Ti, Zr, Al or B, to the hydrolyzed mixture obtained in (b), wherein the molar ratio M/Si is from 0.01/1 to 0.04/1, to obtain a coating sol,
(d) applying the coating sol obtained in (c) to the substrate, and
(e) thermal densification of the coating sol applied in d) at a temperature of from 300° C. to 500° C. to form the glass-like protective layer.

19 Claims, No Drawings

(56) References Cited

OTHER PUBLICATIONS

Nazharova, L.N., et al., "Alkali silica protective coatings". MIST Aerospace, 2018 IOP Conf. Ser.: Mater. Sci. Eng. 450, 032003, pp. 1-3.*
Wang, Bin, et al., "Graphene Coatings as Barrier Layers to Prevent the Water-Induced Corrosion of Silicate Glass". ACS Nano 2016, 10, 9794-98.*
Hamdy, Abdel Salam, et al., "Corrosion protection of aluminum composites by silicate/cerate conversion coating". Surface & Coatings Technology 200 (2006) 3786-3792.*
Abuin, M., et al., "Silica doped with lanthanum sol-gel thin films for corrosion protection". Thin Solid Films, 520 (2012) 5267-5271.*
Liu, Jinling, et al., "Abnormal behavior of silica doped with small amounts of aluminum". Scientific Reports, 6:35556, pp. 1-6.*
Levy et al., Sol-Gel-Handbook, CH-Wiley Verlag GmbH, 2015, vol. 1, p. 13.
Levy et al., Sol-Gel-Handbook, CH-Wiley Verlag GmbH, 2015, vol. 2, p. 796.

* cited by examiner

METHOD FOR PRODUCING DOPED ALKALI SILICATE PROTECTIVE LAYERS ON METAL AND GLASS SUBSTRATES

BACKGROUND OF THE INVENTION

1. Field of the Invention

The invention relates to a glass-like protective layer which is suitable as an anti-corrosion layer on substrates susceptible to corrosion, especially corroding metals, alloys and other materials such as glasses, especially on steel and light metals such as aluminium and titanium as a base coating or as a top layer, as well as the method for its production and its use on metallic substrates for protection against corrosion and, especially, for use as a layer providing protection against tarnishing.

2. Discussion of Background Information

Glass-like sol-gel coatings produced under alkaline conditions are known in the prior art and are suitable as coating material for corrosion protection of easily corroding metals. Especially for metallic materials that are exposed to high temperatures and corrosive media in their field of application, glass-like layers have been shown to be suitable components for protection against corrosion.

Glass substrates are also susceptible to corrosion as they are vulnerable to leaching and hydrolytic decomposition.

DE 19714949 A1 and DE 10059487 A1 describe glass-like layers which are obtained from alkali-containing coating sols. After compression at temperatures up to 500° C., these materials lead to transparent, crack-free and also one-dimensionally bendable layers.

The pure alkali silicate layers described in the prior art must be cured at temperatures up to 500° C., as lower baking temperatures result in performance losses, i.e. lower resistance to chemicals, low non-stick properties and lower resistance in food baking tests. In addition, these layers often tend to crack during the cooling process.

The object of the present invention was to provide protective layers for metals and glasses which do not exhibit the disadvantages described above and can be applied as a single layer. Especially, the object was to provide protective layers for metals or glasses, especially for corrosion protection, in which cracking is largely avoided and which can be cured at relatively low temperatures. Furthermore, good or improved chemical resistance, non-stick properties, protection against tarnishing and resistance in food baking tests of the protective layers should be achieved. At the same time, a sufficiently long pot life and processing time should be obtained.

It was surprisingly found that by adding small amounts of certain metal or boron compounds, especially Ti-alkoxides, to hydrolyzed precursors of sodium-potassium silicates in a certain ratio, the desired properties can be obtained.

SUMMARY OF THE INVENTION

Accordingly, the invention relates to a method for producing a glass-like protective layer on a metal substrate or glass substrate, the produced coated substrate, and the corresponding use as set forth in the independent claims. Preferred embodiments are shown in the dependent claims.

Very good corrosion protection and non-stick properties can be achieved by the method according to the invention already at compression temperatures in the region of 350° C. Crack-free layers are obtained. It was also surprisingly found that the adhesion and corrosion protection of coating sols according to the invention colored with pigments is significantly better than with systems according to the prior art.

In addition, the coating compositions according to the invention have a pot life that allows these systems to be stored for a sufficiently long time. Thus, the systems are suitable for industrial spray application, in contrast to the Ti-containing heterocondensates known in the literature. It is also advantageous that the protection is achieved by a single layer, i.e. an individual layer. In the prior art, double-layer systems are often required.

The invention is explained in detail below.

The invention relates to a method for producing a glass-like protective layer on a metal substrate or glass substrate or on a pre-coated metal substrate or glass substrate, said method comprising a) mixing one or more silicon compounds of formula (I)

$$R_n SiX_{4-n} \quad (I)$$

where R is independently alkyl, aryl, alkaryl or arylalkyl, X is independently alkoxy or acyloxy, and n is 0, 1 or 2, with the proviso that at least one silicon compound of formula (I) is used, where n is 1 or 2, with NaOH and KOH, b) adding water to the mixture obtained in step a) to hydrolyze the silicon compound(s) of formula (I), c) adding at least one compound of formula (II)

$$MY_m \quad (II)$$

where M is Pb, Ti, Zr, Al or B, preferably Ti, Y is independently alkoxy, and m corresponds to the valence of M, wherein one or more alkoxy groups may be replaced by one or more chelate formers, to the hydrolyzed mixture obtained in step b), wherein the molar ratio M/Si is in the range of 0.01/1 to 0.04/1, wherein M is the molar amount of M in the at least one compound of formula (II) and Si is the molar amount of Si in the at least one silicon compound of formula (I), to obtain a coating sol, d) applying the coating sol obtained in step c) to the metal substrate or glass substrate or the pre-coated metal substrate or glass substrate, and e) thermally densifying the coating sol applied in step d) at a temperature in the range of 300° C. to 500° C. to form the glass-like protective layer.

In step a) of the method according to the invention, one or more silicon compounds are mixed with NaOH and KOH. The one or more silicon compounds have the following formula (I)

$$R_n SiX_{4-n} \quad (I)$$

where R is independently alkyl, aryl, alkaryl or arylalkyl, X is independently alkoxy or acyloxy, and n is 0, 1 or 2, with the proviso that at least one silicon compound of formula (I) is used, where n is 1 or 2.

In the silicon compound(s) of formula (I), the group R is preferably selected from $C_{1-4}$ alkyl, especially methyl or ethyl, or phenyl. The group X is preferably selected from $C_{1-4}$ alkoxy, especially methoxy or ethoxy.

In a preferred embodiment, at least one silicon compound of formula (I), where n is 1 or 2, preferably 1, and at least one silicon compound of formula (I), where n is 0, are used as the one or more silicon compounds of formula (I), wherein the molar ratio of the at least one silicon compound of formula (I), where n is 1 or 2, to the at least one silicon compound of formula (I), where n is 0, is preferably in the range of 1 to 10, preferably from 3 to 5. These preferred molar ratios result in layers which have an especially suitable flexibility and can be cured without cracking.

Examples of silicon compounds of formula (I) are $Si(OCH_3)_4$, $Si(OC_2H_5)_4$, $Si(O\text{-}n\text{-} \text{ or } i\text{-}C_3H_7)_4$, $Si(OC_4H_9)_4$, $Si(OOCC_3H)_4$, methyltri(m)ethoxysilane ((m)ethoxy means methoxy or ethoxy), methyltripropoxysilane, ethyltri(m)ethoxysilane, phenyltri(m)ethoxysilane, dimethyldi(m)ethoxysilane and diphenyldi(m)ethoxysilane. Of these silanes, tetramethoxysilane and tetraethoxysilane (TEOS) (n=0) and methyltriethoxysilane (MTEOS) (n=1) are especially preferred. The silicon compound(s) of formula (I) are especially preferably a combination of TEOS and MTEOS, especially in the molar ratios indicated above.

The one or more silicon compounds of formula (I) are mixed with NaOH and KOH. The sodium hydroxide and the potassium hydroxide are usually each added in solid form. Mixing may be assisted, for example, by stirring. It is useful to stir until the NaOH and KOH have dissolved in the silicon compound(s) of formula (I).

NaOH and KOH catalyze the hydrolysis and condensation of the silicon compound(s) of formula (I) after the addition of water in step b) (basic catalysis). It was shown that by using potassium hydroxide and sodium hydroxide in combination, an especially dense and crack-free layer is obtained. The addition of the condensation catalysts results in a stronger densification of the inorganic network.

The molar ratio of NaOH to KOH is, for example, in the range of 0.5 to 1.5, preferably 0.8 to 1.2.

The molar ratio Si/(Na+K) is preferably in the range of 20 to 7, more preferably 15 to 10, for obtaining especially dense and crack-free layers, wherein Si is the molar amount of Si in the at least one silicon compound of formula (I) and (Na+K) is the total molar amount of Na and K in NaOH and KOH.

According to step b), water is added to the mixture obtained in step a) for the hydrolysis of the silicon compound(s) of formula (I). As already explained, the bases KOH and NaOH catalyze the hydrolysis of the silicon compound(s). The hydrolyzed silicon compounds, as applicable, may already partially condense with each other. Thus, a sol may form which contains hydrolyzed monomeric silicon compounds and Na/K silicate clusters.

The hydrolysis of the silicon compound(s) of formula (I) is carried out according to the known sol-gel process. Further details of the sol-gel process are described, for example, in C. J. Brinker, G. W. Scherer: "Sol-Gel Science—The Physics and Chemistry of Sol-Gel-Processing", Academic Press, Boston, San Diego, New York, Sydney (1990).

The amount of water added in step b) is, for example, in the range of 0.2 to 0.5 mol, preferably 0.3 to 0.4 mol, per mol of hydrolyzable groups present in the silicon compound(s) of formula (I). If the amount of water is >0.5 mol, the mixture may gel. If the amount of water is <0.2 mol, cracks may appear in the layer.

When water is added, the exothermic hydrolysis reaction begins, resulting in heating of the mixture. In a preferred embodiment of the invention, the water is added in step b) in such a way that the temperature of the mixture does not exceed 40° C., preferably does not exceed 36° C. This can be achieved, for example, by adding the water slowly or in drops or in portions.

It is further preferred if the mixture heated by the hydrolysis reaction is allowed to cool to a temperature in the range of 15 to 25° C. after the addition of the water and, if necessary, is diluted with an organic solvent before at least one compound of formula (II) is added according to step c).

In step c), at least one compound is added to the hydrolyzed mixture obtained in step b), said compound being of formula (II)

$$MY_m \qquad (II)$$

wherein M is Pb, Ti, Zr, Al or B, preferably Ti, Y is independently alkoxy, preferably $C_{1-8}$ alkoxy, especially $C_{1-4}$ alkoxy, and m corresponds to the valency of M, wherein m may be, for example, 2, 3 or 4, wherein one or more alkoxy groups may be replaced by one or more chelate formers and/or two alkoxy groups may be replaced by an oxo group (=O). For M=Ti or Zr, m is usually 4. For M=Al or B, m is usually 3, wherein the compound may be present as an adduct, for example with a Lewis base. For M=Pb, m is usually 2. Preferably, no alkoxy groups are replaced by chelate formers, i.e. in the compound of formula (II), Y is an alkoxy group in each case.

Examples of suitable chelate formers are carboxylates, for example acetate, acrylate and methacrylate, β-diketonates, for example acetylacetonates, and amino alcoholates, for example the alcoholate of triethanolamine. In each case, a chelating agent may replace, for example, one or two, preferably one, alkoxy group in each case. In the compound of formula (II), all alkoxy groups may be replaced by chelating agents, but it is preferred that at least one, preferably at least two, alkoxy groups are present in the compound of formula (II).

Especially preferably, the compound of formula (II) is a compound of formula (II), where Y is alkoxy, especially a tetraalkoxytitanium, the alkoxy preferably being $C_{1-8}$ alkoxy, especially $C_{1-4}$ alkoxy.

Suitable compounds of formula (II) are, for example, $Ti(OC_2H_5)_4$, $Ti(O\text{-}n\text{-} \text{ or } i\text{-}C_3H_7)_4$, $Ti(OC_4H_9)_4$, diisopropoxybis(ethylacetoacetato)titanate, poly(dibutyl titanate), titanium 2-ethylhexoxide, titanium bis(triethanolamine) diisopropoxide, $Al(OC_2H_5)_3$, $Al(O\text{-sec.-}C_4H_9)_3$, $Zr(OC_3H_7)_4$, zirconium 2-ethylhexoxide, $B(OCH_3)_3$, $Zr(OC_3H_7)_2(OOC(CH_3)=CH_2)_2$, titanium acetylacetonate, titanium oxide bis(pentanedionate), $Ti(OC_3H_7)_3(OOC(CH_3)=CH_2)$ and $Ti(OC_2H_4)_3$(allyl acetoacetate), lead acetate and lead diisopropoxide.

The molar ratio M/Si is in the range of 0.01/1 to 0.04/1, wherein M is the molar amount of M in the at least one compound of formula (II) and Si is the molar amount of Si in the at least one silicon compound of formula (I). The molar ratio M/Si is preferably in the range of 0.015/1 to 0.35/1, more preferably from 0.02/1 to 0.03/1, even more preferably from 0.021/1 to 0.03/1. The specified setting of the molar ratio M/Si achieves especially reduced cracking in the protective layers obtained.

After the addition of the at least one compound of formula (II), a coating sol is obtained. By the method according to the invention, a relatively uniform distribution of the M atoms of the compound of formula (II) in the alkali silcate sol can be achieved. Without wishing to be bound by any theory, it is assumed that the coating sol obtained usually comprises alkali silicate of Na and K doped with the M atoms, preferably Ti, and especially is a precondensed layer-forming sol containing monomer units and alkali silicate clusters doped with the M atoms, especially Ti.

By adding the compound of formula (II) according to step c), the hydrolysis and polycondensation products of the silicon compound(s) of formula (I) are co-condensed with the compound of formula (II). This showed a positive effect on the resulting layer properties, as will be explained later, especially when using a compound of formula (II) with M=Ti, especially titanium tetraalkoxides.

The addition of the compound of formula (II), especially the boron or metal alkoxides of formula (II) with M=Pb, Ti, Zr, Al or B, preferably Ti, is characterized in that the compound of formula (II) or the alkoxide can be added to the system without stabilizers.

Stabilizers which have a stabilizing effect on the compound of formula (II) are known and can be added if necessary. Preferably, chelating ligands are used here. Suitable chelating agents are, for example, the examples of chelate formers mentioned above. However, it is preferred and a particular advantage of the present invention that no stabilizers and especially no chelate formers need to be added to the coating sol.

Furthermore, at least one pigment, preferably a coloring pigment, may be added to the coating sol or a precursor thereof. It was surprisingly found that very good adhesion of the protective layer and good corrosion protection are obtained with the coating sols produced in accordance with the invention which contain coloring pigments. The coloring pigments can be common, commercially available pigments, for example organic or inorganic pigment pastes and powders, for example pigments based on carbon black (for example Printex® 90) or graphite (for example TIMREX® KS), azo dyes, pigments based on titanium dioxide (for example Kronos® 2360), iron oxide (for example Bayferrox® 318 M) or spinel (for example Sherpherd® 30C365). Other possibilities are metallic pigments, for example based on iron (for example Stapa Ta Ferricon® 200), zinc (for example Stapa® Zinc Paste) or aluminum (for example Stapa Hydrolan S®), aluminum pigments or pearlescent pigments (for example Iriodin® from Merck).

According to step d), the coating sol obtained in step c) is applied to a metal substrate or glass substrate or a pre-coated metal substrate or glass substrate. The coating sol obtained is preferably applied to a metal substrate or a pre-coated metal substrate.

To adjust a viscosity suitable for application, the coating sol can, if required, be diluted with one or more solvents, especially organic solvents. Ethanol, isopropanol, butanol and their isomers are especially suitable for diluting the coating sols. Further examples of suitable solvents are amyl alcohol, hexanol or ether. The dilution can be adjusted by a solvent or a combination of solvents.

The metal substrate is preferably selected from a substrate of steel, especially stainless steel or austenitic steel, aluminium, aluminium alloy, titanium, titanium alloy, magnesium or magnesium alloy.

The metal substrate can be provided with a pre-coating, for example an enamel layer or a primer.

The glass substrate is preferably selected from a substrate of soda lime glass, borosilicate glass, lead crystal and silica glass. It may be, for example, flat glass, hollow glass such as container glass, or laboratory apparatus glass. The glass substrate may optionally have a pre-coating, for example an enamel layer.

The coating sol can be applied to the metal substrate or glass substrate or the pre-coated metal substrate or glass substrate by common coating methods, for example spray coating, electrostatic spraying, dip coating, spin coating or coil coating. A spray method is preferred. The applied coating sol can be subjected to drying if necessary.

According to step e), the coating sol applied in step d) is thermally densified or cured at a temperature in the range of 300° C. to 500° C. to form the glass-like protective layer. The baking temperature for thermal densification lies at temperatures up to 500° C., especially 300° C. to 475° C. and especially preferably 350° C. to 425° C., even more preferably 350° C. to 375° C. An especial advantage of the method according to the invention is that the coating sols can be densified or cured at low temperatures to form crack-free layers and the good properties, such as resistance to chemicals and non-stick properties, are retained. A lower temperature can also reduce a possible discoloration.

The heating of the applied coating sol for thermal densification or curing can be achieved, for example, by heat convection and by irradiation with NIR radiation.

Thermal densification can be carried out, for example, in a single-stage or two-stage manner, although three-stage or higher-stage densifications are also conceivable. A single-stage thermal densification can, for example, be carried out under a specific atmosphere, for example an atmosphere with an oxygen content of at least 1 vol. %, such as air, or in an inert gas atmosphere (oxygen content preferably below 1000 ppm). During a two-stage thermal densification, the thermal densification is carried out in two different atmospheres, for example in a first stage at relatively low temperatures in an oxygen-containing atmosphere and in a subsequent second stage at relatively high temperatures in a largely oxygen-free atmosphere.

A two-stage densification process may be advantageous over single-stage densification to achieve a reduction in the tarnish color on metal substrates or glass substrates, especially metal substrates that are susceptible to tarnishing, such as steel, especially stainless steel.

In a special embodiment, the thermal densification can be carried out in two stages, with the applied coating sol being first heated in an atmosphere with an oxygen content of at least 1 vol. %, for example air, to a temperature in a range of 150 to 200° C. and subsequently heated in an inert gas atmosphere to a temperature in the range of 300° C. to 500° C., especially 300° C. to 475° C., especially preferably at 350° C. to 425° C., even more preferably 350° C. to 375° C., wherein the oxygen content of the inert gas atmosphere is preferably below 1000 ppm, more preferably below 800 ppm.

The glass-like protective layer preferably forms a base coating or a top layer on the metal substrate or glass substrate. In one embodiment, the glass-like protective layer may be applied as the only coating on the metal substrate or glass substrate or on a metal substrate or glass substrate pre-coated with an enamel layer. In another embodiment, in addition to the glass-like protective layer, one or more further coatings may be applied to the metal substrate or glass substrate or to a metal substrate or glass substrate pre-coated with an enamel layer, in which case the glass-like protective layer is preferably the base layer or the top layer.

Common protective layers based on the sol-gel process often have a double-layer system of sol-gel layers. An advantage of the method described herein is that the protective layer produced according to the invention using the sol-gel process provides sufficient protection for the metal substrate or glass substrate as a single layer, so that a second layer produced according to the sol-gel process is not required. In a preferred embodiment of the method according to the invention, no coating with a coating composition prepared according to the sol-gel process (i.e. sol-gel layer) is applied immediately above and below the glass-like protective layer. Especially preferably, in the method according to the invention, apart from the described glass-like protective layer, no further coating with a coating composition produced according to the sol-gel process (i.e. sol-gel layer) is applied to the metal substrate or glass substrate.

Without wishing to be bound by a theory, it is assumed that the protective layer or anti-corrosion layer formed is especially an alkali silicate layer which has been doped by the compound of formula (II), preferably titanium alkoxides, the alkali silicate layer being formed from the pre-condensed silicon compounds of formula (I) responsible for the layer formation as precursors.

The layer thickness of the glass-like protective layer after thermal densification can be in the range of, for example, 2 to 10 μm, preferably 4 to 8 μm. Preferably, the glass-like protective layer is substantially inorganic. The non-volatile organic components or groups in the coating sol are preferably burnt out at least to a large extent during thermal compression.

The invention further relates to a metal substrate or glass substrate with a glass-like protective layer, obtainable by the method according to the invention described above. All the features and embodiments described above for the method according to the invention apply correspondingly to the metal substrate or glass substrate according to the invention.

The invention also relates to the use of the glass-like protective layer obtained by the method according to the invention as an anti-corrosion layer and/or as an anti-fingerprint layer and/or as a non-stick layer on a metal substrate or glass substrate.

Specific examples for the use of the coating solution according to the invention on various substrates are given below.

Non-Stick Properties on Enameled Surfaces

Enamelled surfaces are used on baking trays and oven liners, among other things. For such applications, the enameled surfaces must meet certain mechanical properties and have chemical resistance to cleaning agents and certain foods. Especially problematic here is the adhesion of burnt-on standard foodstuffs, which is tested by food baking tests.

Tests were carried out on the non-stick properties of the protective layer produced in accordance with the invention. These are reproduced below in Example 4. Here, the advantage of the glass-like protective layers produced in accordance with the invention as an overcoating is shown compared to layers produced with sols from the prior art.

Surprisingly, it was found that the coating sols produced by the method according to the invention, especially the titanium-containing coating sols, are very well suited for overcoating enamel. Compared to the pure enamel layer, the overcoating by the method according to the invention is characterized by a reduced surface energy, which is the reason for the good non-stick properties of the protective layer according to the invention. Comparative investigations in the food baking test showed that the overcoating of the enamel layer with a sol according to the prior art does not lead to any improvement in resistance.

Pigmented Compositions

In Example 5 described below, temperature-stressed components (for example for the automotive sector) made of stainless steel 1.4301 were coated with a prior-art sol-gel system containing aluminum pigments as coloring agent. After thermal curing, however, it became apparent that these layers peel off locally under certain conditions. These local defects occur especially in the area of shaped surfaces, i.e. in areas where strong mechanical forces were used for shaping.

The steel 1.4301 is an austenitic, corrosion-resistant steel that is not ferromagnetic. However, the chemical composition is such that 10%-40% of the structure can consist of ferrite or martensite. Especially through cold forming, parts of the austenite can be mechanically induced to transform into martensite. The "transformation martensite" formed in this way then has different thermal and mechanical properties than the surrounding austenite. The electrochemical resistance of the martensitic structure is usually lower than that of the austenite. Heat treatment after application of the sol-gel layer would temper the mechanically induced martensite, so that after heat treatment a mixed structure of austenite and "tempered structure" should be present.

Since in the above-described components the layer detachment always occurred in strongly plastically shaped areas, which are then also magnetic, it is obvious that in these areas the structure partly consists of martensite, which was formed in a mechanically induced manner from austenite, or of tempered structure. The delayed flaking of the layer after coating of the shaped stainless steel components could thus be caused by local corrosion, which starts at martensitic areas below the sol-gel layer, preferably near the edges. After initial flaking, the corrosion then progresses as layer corrosion and gradually detaches more and more areas of the sol-gel layer.

Surprisingly, as described in Example 5 below, there is no delamination in shaped areas when using the sol produced in accordance with the invention. The incorporation of the Ti components improves adhesion, and thus the required corrosion protection is guaranteed.

Comparative NMR spectra of the prior art sol with the sol produced in accordance with the invention unexpectedly showed that, after the addition of the Ti component, the degree of condensation is reduced compared to the initial system. Without wishing to be bound to a particular theory, it can be said that the use of the titanium component expands the network, thereby increasing the flexibility of the layer. The increase in adhesion can be explained by an increase in the number of uncondensed free groups that can react with the metal or glass surface.

Protective Layers on Titanium Sheets

Decorative metal surfaces made of titanium have recently found many uses in the interior of automobiles or as a material for the manufacture of sophisticated objects of daily use. They are characterized by good corrosion resistance. One disadvantage of these surfaces is their sensitivity to fingerprints, which often leave traces of oxidation. The application of a conventional clear lacquer, which is not abrasion and scratch resistant, leaves an inferior appearance.

An improvement in resistance to fingerprint marks is achieved by using fluorine-containing metal oxide sols. However, known methods only insufficiently reduce the sensitivity to fingerprint marks. Another shortcoming is that toxic fluorocarbons are released when exposed to high temperatures.

As described in Example 6 below, the sensitivity to fingerprint marks of substrates made of titanium could unexpectedly be reduced by a protective coating produced by the method according to the invention. While at baking temperatures of 500° C. the titanium forms distinct tarnish colors, the reduction of the baking temperature to 350° C. possible with the coating sol produced in accordance with the invention completely eliminates the tarnish color while maintaining excellent anti-fingerprint, anti-corrosion and mechanical properties.

DETAILED DESCRIPTION OF EXEMPLARY EMBODIMENTS OF THE INVENTION

The invention is further explained by the following examples, which are not intended to limit the invention in any way.

EXAMPLES

Synthesis Example 1

Step a) 593 g tetraethoxysilane and 2032 g methyltriethoxysilane are placed in a flask and 36 g sodium hydroxide and 49 g KOH are added successively while stirring. The mixture is stirred until the salts are completely dissolved. Then, 290 ml of water are added dropwise in the manner known to a person skilled in the art so that a temperature of 36° C. is not exceeded.

Step b) Once the addition of water is complete, the mixture is allowed to cool and 900 g of 2-propanol are added. 117 g of tetrabutyl titanate (TBOT) are added slowly, dropwise, to the mixture, which is now stirred at 250 rpm. A rest period before addition of the titanium compound is not necessary. The reaction solution is then stirred for a further 2 hours before a sol suitable for coating is obtained. The Ti/Si molar ratio in the coating sol is 0.024/1.

Comparative Synthesis Example 1

593 g tetraethoxysilane and 2032 g methyltriethoxysilane are placed in a flask and 36 g sodium hydroxide and 49 g KOH are added successively while stirring. The mixture is stirred until the salts are completely dissolved. Then, 290 ml of water are added dropwise in the manner known to a person skilled in the art so that a temperature of 36° C. is not exceeded.

Once the addition of water is complete, the mixture is allowed to cool and 900 g of 2-propanol are added. 231.3 g of tetrabutyl titanate (TBOT) are added slowly, dropwise, to the mixture, which is now stirred at 250 rpm. A rest period before addition of the titanium compound is not necessary. The reaction solution is then stirred for a further 2 hours before a sol suitable for coating is obtained. The Ti/Si molar ratio in the coating sol is 0.048.

Comparative Synthesis Example 2

593 g tetraethoxysilane and 2032 g methyltriethoxysilane are placed in a flask and 36 g sodium hydroxide and 49 g KOH are added successively while stirring. The mixture is stirred until the salts are completely dissolved. Then, 290 ml of water are added dropwise in the manner known to a person skilled in the art so that a temperature of 36° C. is not exceeded.

Once the addition of water is complete, the mixture is allowed to cool and 900 g of 2-propanol are added. 492 g of tetrabutyl titanate (TBOT) are added slowly, dropwise, to the mixture, which is now stirred at 250 rpm. A rest period before addition of the titanium compound is not necessary. The reaction solution is then stirred for a further 2 hours before a sol suitable for coating is obtained.

The Ti/Si molar ratio in the coating sol is 0.10.

Comparative Synthesis Example 3

Analogous to Synthesis Example 1, methyltriethoxysilane and tetraethoxysilane are placed in a flask and sodium hydroxide and potassium hydroxide are added. After the added alkali hydroxide has completely dissolved, the amount of tetrabutyl titanate mentioned in Synthesis Example 1 is slowly added, dropwise, to the reaction mixture. Immediately after the start of hydrolysis (when water is added), the $TiO_2$ precipitates as a white precipitate.

A mixture is obtained that is unsuitable as a coating.

Synthesis Example 2—Synthesis Example for Pigmented Sol 3200 g of the sol prepared according to Synthesis Example 1, step a) are mixed, after cooling, with 3186 g of a solution mixture consisting of equal parts by weight of ethanol, isopropanol and 1-butanol. 288 g of tetrabutyl titanate (TBOT) are slowly added, dropwise, to the mixture, which is now stirred at 250 rpm. The reaction solution obtained is stirred for at least 30 minutes.

Then, 500 g of an aluminium-containing pigment (STAPA IL HYDROLAN S 2100 Eckart) are added to this mixture within 10 minutes while stirring at 250 rpm. The mixture obtained is stirred for at least 30 minutes before a coatable sol is obtained.

The molar ratio Ti/Si in the coating sol is as in Synthesis Example 1.

Example 1

The coating sol prepared according to Synthesis Example 1 was applied to a titanium substrate by means of a spraying process. The coating sol can be applied as described in Synthesis Example 1 without further dilution steps (by adding solvent).

The titanium substrate coated with the coating sol according to Synthesis Example 1 is heated to 350° C. in a heating oven under standard atmosphere, i.e. air, at a rate of 10 K/min and held at this temperature for 30 min after reaching the temperature. The temperature is then cooled at max. speed to at least 200° C. before the cured substrates can be removed from the oven.

The glass-like protective layer obtained after curing is crack-free.

Comparative Example 1

The coating sol prepared in accordance with Comparative Synthesis Example 1 was applied to a titanium substrate by means of a spraying process as in Example 1, and the titanium substrate coated with the coating sol according to Comparative Synthesis Example 1 was cured according to the densification method described in Example 1.

The glass-like protective layer obtained after curing shows cracks.

Comparative Example 2

The coating sol prepared in accordance with Comparative Synthesis Example 2 was applied to a titanium substrate by means of a spraying process as in Example 1, and the titanium substrate coated with the coating sol according to Comparative Synthesis Example 2 was cured according to the densification method described in Example 1.

The glass-like protective layer obtained after curing shows cracks.

Example 2

The coating sol prepared in accordance with Synthesis Example 1 was applied to a stainless steel substrate by means of a spraying process and cured according to the compaction process described in Example 1.

The glass-like protective layer obtained after curing is crack-free. The substrate shows a certain tarnish colour after curing.

Example 3

The coating sol prepared in accordance with Synthesis Example 1 was applied to stainless steel substrates as in Example 2. The coated stainless steel substrates (samples) are subjected to a two-stage compression process.

For this purpose, the furnace chamber containing the samples is heated to 150-200° C. After reaching this temperature, the sample chamber is evacuated until a pressure of at least 10 mbar is reached. After evacuation, the sample chamber is flooded with $N_2$ and flushed until the oxygen content is below 800 ppm.

Alternatively, this value can also be reached by repeated evacuation and flooding. As soon as the $O_2$ value is below 800 ppm and the sample chamber is sufficiently flooded with inert gas, the temperature is raised to 500° C. at a rate of 10 k/min. The target temperature is maintained for 10 min. The temperature is then cooled to at least 200° C. at max. speed before the cured substrates can be removed from the oven.

The glass-like protective layer obtained after curing is crack-free. The substrate shows virtually no tarnish colour after curing. In order to reduce the discolouration of stainless steel substrates during the curing step, an inerting step can therefore be added during densification.

Example 4

The adhesion of burnt-on standard foods is tested using a food baking test. These standard foods used are apricot jam, egg yolk, egg white, olive oil, tomato puree and mustard. These are each applied to metal substrates (samples A, B and C as described below) and baked at a temperature of 250° C. for 10 minutes. The areas where the food was applied are cleaned mechanically with a white sponge, washing-up liquid and warm water and the result is assessed.

Sample A: enameled substrate
Sample B: enameled substrate according to sample A, in which a coating sol containing alkali silicate according to Example 2 of DE 19714949 A1 is applied to the enamel and bonded to the enamel layer in a baking step at 500° C. analogously to Example 4 of DE 19714949 A1 with the formation of a glass-like layer.
Sample C: enameled substrate according to sample A, in which a coating sol according to the invention is applied to the enamel layer by spray application according to Synthesis Example 1 and is bonded to it in a baking step to form a glass-like layer (alkali silicate layer containing Ti). The coating sol is cured at 350° C. in the baking step analogously to the compression process described in Example 1.

The obtained samples A, B and C were then subjected to the food baking test with 6 foods each as described above. The results of the tested systems are shown in Table 1.

TABLE 1

| Sample | Apricot jam | Egg yolk | Egg white | Olive oil | Tomato pulp | Mustard |
|---|---|---|---|---|---|---|
| A | − | −−− | −− | − | − | − |
| B | ± | ± | ± | ± | ± | ± |
| C | ++ | ++ | ++ | +++ | +++ | +++ |

Key: −/−−/−−−: slight/medium/severe damage
±: no change compared to enamel;
+/++/+++: slight/medium/severe improvement compared to the prior art.

As can be seen from Table 1, the alkali silicate layers containing Ti according to the invention (sample C) show the best results in all food baking tests performed. In contrast to the pure enamel surface (sample A), which was clearly damaged in all tests, and in comparison to a coating (sample B) corresponding to the prior art, which shows only slightly improved properties compared to the enamel surface, the Ti-containing alkali silicate layer according to the invention passes all tests.

The protective layer obtained by the method according to the invention at a baking temperature of 350° C. shows the best results compared to the pure enamel layer and the surfaces coated in accordance with the prior art.

Example 5

According to the prior art, temperature-stressed components (for example for the automotive sector) made of stainless steel 1.4301 are coated with an alkali silicate sol-gel system from the prior art, which contains aluminum pigments as coloring agent. After thermal curing, however, it became apparent that these layers detach locally under certain conditions. These local defects occur especially in the area of shaped surfaces, i.e. in areas where strong mechanical forces were applied for shaping. After initial flaking, the corrosion then progresses as layer corrosion and gradually detaches more and more areas of the sol-gel layer.

In another experiment, the temperature-loaded components made of stainless steel 1.4301 are coated by the method according to the invention with a coating sol according to Synthesis Example 2, which contains the above-mentioned aluminium pigments as colouring agents, and cured by thermal densification. Surprisingly, with the protective coating produced in accordance with the invention, there is no delamination in unshaped areas. The incorporation of the Ti components improves adhesion, and thus the required corrosion protection is ensured.

Comparative NMR spectra of the prior-art sol with the sol produced in accordance with the invention unexpectedly showed that the degree of condensation is reduced after the addition of the Ti component compared to the initial system.

Example 6

The coating sol prepared in accordance with Synthesis Example 1 was applied to titanium substrates to obtain samples. Thermal densification of the coated samples was carried out, on the one hand, at a baking temperature of 350° C. as described in Example 1 and, on the other hand, analogously but at a baking temperature of 500° C.

Unexpectedly, in both cases the sensitivity to fingerprint marks of the titanium substrate could be reduced by applying the coating sol by the method according to the invention. It was found that at baking temperatures of 500° C., the titanium formed distinct tarnish colors. The reduction of the baking temperature to 350° C., which is possible with the composition according to the invention, completely eliminates the tarnish color while maintaining excellent anti-fingerprint, anti-corrosion and mechanical properties.

What is claimed is:
1. A method for producing a vitreous protective layer on a metal substrate or a glass substrate or a pre-coated metal substrate or a pre-coated glass substrate, wherein the method comprises
   (a) mixing with NaOH and KOH one or more silicon compounds of formula (I)

$$R_nSiX_{4-n} \qquad (I)$$

in which R is independently alkyl, aryl, alkaryl or arylalkyl, X is independently alkoxy or acyloxy, and n is 0, 1 or 2, with the proviso that at least one silicon compound of formula (I) in which n is 1 or 2 is used, (b) adding water to a mixture obtained in (a) to hydrolyze the silicon compound(s) of formula (I), (c) adding at least one compound of formula (II)

$$MY_m \qquad (II)$$

in which M is Pb, Ti, Zr, Al or B, Y is independently alkoxy, and m corresponds to a valence of M, wherein one or more alkoxy groups may be replaced by one or more chelate formers and/or two alkoxy groups may be replaced by an oxo group, to a hydrolyzed mixture obtained in (b), a molar ratio M/Si being from 0.01/1 to 0.04/1, M being a molar amount of M in the at least one compound of formula (II) and Si being a molar amount of Si in the at least one silicon compound of formula (I), to obtain a coating sol, (d) applying the coating sol obtained in (c) to the metal substrate or glass substrate or the pre-coated metal substrate or the pre-coated glass substrate, and (e) thermal densification of the coating sol applied in (d) at a temperature of from 300° C. to 500° C. to form the glass like vitreous protective layer.

2. The method of claim 1, wherein in the silicon compound of formula (I) the group R is selected from $C_{1-4}$ alkyl or phenyl, and/or the group X is selected from $C_{1-4}$ alkoxy, and/or wherein in the compound of formula (II) the group Y is selected from $C_{1-8}$ alkoxy.

3. The method of claim 1, wherein in the silicon compound of formula (I) the group R is selected from methyl, ethyl or phenyl, and/or the group X is selected from methoxy or ethoxy, and/or wherein in the compound of formula (II) the group Y is selected from $C_{1-4}$ alkoxy.

4. The method of claim 1, wherein the one or more silicon compounds of formula (I) comprise at least one silicon compound A of formula (I), in which n is 1 or 2, and at least one silicon compound B of formula (I), in which n is 0.

5. The method of claim 4, wherein a molar ratio of the at least one silicon compound A to the at least one silicon compound B is from 1 to 10.

6. The method of claim 4, wherein a molar ratio of the at least one silicon compound A to the at least one silicon compound B is from 3 to 5.

7. The method of claim 1, wherein a molar ratio Si/(Na+K) is from 20 to 7, Si being a molar amount of Si in the at least one silicon compound of formula (I) and (Na+K) being a total molar amount of Na and K in NaOH and KOH.

8. The method of claim 1, wherein the metal substrate is selected from a substrate of steel, aluminum, aluminum alloy, titanium, titanium alloy, magnesium or magnesium alloy.

9. The method of claim 1, wherein the molar ratio M/Si is from 0.015/1 to 0.035/1.

10. The method of claim 1, wherein the molar ratio M/Si is from 0.021/1 to 0.03/1.

11. The method of claim 1, wherein water added in (b) is added in an amount of from 0.2 to 0.5 mol per mol of hydrolyzable groups present in the silicon compound(s) of formula (I).

12. The method of claim 1, wherein water is added in (b) at a rate such that a temperature of the mixture does not exceed 40° C.

13. The method of claim 1, wherein the mixture heated by the hydrolysis reaction is allowed to cool to a temperature of from 15° C. to 25° C. after addition of the water before at least one compound of formula (II) is added in (c).

14. The method of claim 1, wherein at least one pigment and/or at least one chelate former is added to the coating sol or a precursor thereof.

15. The method of claim 1, wherein the thermal densification is carried out at a temperature of from 300° ° C.to 475° C.

16. The method of claim 1, wherein the thermal densification is carried out in two stages, the applied coating sol being first heated in an atmosphere having an oxygen content of at least 1 vol.% to a temperature of from 150° C. to 200° C. and being subsequently heated in an inert gas atmosphere to a temperature of from 300° C. to 500° C.

17. The method of claim 1, wherein the vitreous protective layer is applied as the only coating on the metal substrate or glass substrate.

18. The method of claim 1, wherein the coating sol is applied to a metal substrate or glass substrate which is pre-coated with an enamel layer.

19. The method of claim 1, wherein the layer thickness of the glass- like vitreous protective layer after thermal densification is from 2 μm to 10 μm.

* * * * *